United States Patent
Tan et al.

(10) Patent No.: US 7,651,554 B2
(45) Date of Patent: Jan. 26, 2010

(54) HYDROGEN STORAGE SYSTEM

(75) Inventors: Zhaosheng Tan, Troy, MI (US);
Michael A. Fetcenko, Rochester, MI (US)

(73) Assignee: Ovonic Hydrogen Systems LLC, Rochester Hills, MI (US)

( * ) Notice: Subject to any disclaimer, the term of this patent is extended or adjusted under 35 U.S.C. 154(b) by 266 days.

(21) Appl. No.: 11/978,024

(22) Filed: Oct. 26, 2007

(65) Prior Publication Data

US 2009/0107853 A1 Apr. 30, 2009

(51) Int. Cl.
*F17C 11/00* (2006.01)
*C01B 3/00* (2006.01)

(52) U.S. Cl. .............................. 96/108; 96/151; 206/0.7

(58) Field of Classification Search ............... 96/108, 96/121, 126–128, 133, 147, 148, 151; 206/0.7; 423/248, 648.1, 658.2; 420/900; 502/526
See application file for complete search history.

(56) References Cited

U.S. PATENT DOCUMENTS

| | | | | |
|---|---|---|---|---|
| 4,165,569 A | * | 8/1979 | Mackay | 34/416 |
| 4,187,092 A | * | 2/1980 | Woolley | 62/46.2 |
| 4,446,111 A | * | 5/1984 | Halene et al. | 422/200 |
| 4,548,044 A | * | 10/1985 | Sakai et al. | 62/46.2 |
| 4,859,427 A | * | 8/1989 | Konishi et al. | 422/159 |
| 4,964,524 A | * | 10/1990 | Halene | 220/586 |
| 5,827,358 A | * | 10/1998 | Kulish et al. | 96/115 |
| 6,015,041 A | * | 1/2000 | Heung | 206/70 |
| 6,318,453 B1 | | 11/2001 | Ovshinsky et al. | |
| 6,378,601 B1 | | 4/2002 | Ovshinsky et al. | |
| 6,418,275 B1 | * | 7/2002 | Yang | 392/441 |
| 6,709,497 B2 | | 3/2004 | Myasnikov et al. | |
| 6,918,382 B2 | | 7/2005 | Ramachandran et al. | |
| 6,969,545 B2 | | 11/2005 | Finamore | |
| 6,991,770 B2 | | 1/2006 | Suzuki et al. | |
| 6,997,242 B2 | * | 2/2006 | Fujita et al. | 165/104.12 |
| 7,455,723 B2 | * | 11/2008 | Voss et al. | 96/126 |
| 2002/0020299 A1 | * | 2/2002 | Iwamoto et al. | 96/146 |
| 2005/0072786 A1 | | 4/2005 | Gagnon et al. | |

* cited by examiner

*Primary Examiner*—Frank M Lawrence
(74) *Attorney, Agent, or Firm*—David W. Schumaker (57) ABSTRACT

A system for the solid state storage of hydrogen in accordance with several exemplary embodiments is disclosed herein. The system includes a plurality of hydrogen storage containers. Each hydrogen storage container of the plurality of hydrogen storage containers has an inner chamber and an inlet. The inlet provides a pathway for introducing hydrogen gas into the inner chamber. The inner chamber having a solid hydrogen storage medium disposed therein. The system further includes an endplate manifold having a hydrogen receiving port, a plurality of hydrogen outlet ports, and a flow channel. The hydrogen flow channel is integrated into the endplate manifold. Each hydrogen outlet port is in fluid communication with the inlet of one of the plurality of hydrogen storage containers. The hydrogen flow channel provides fluid communication between the hydrogen receiving port and each hydrogen outlet port.

25 Claims, 6 Drawing Sheets

HYDROGEN STORAGE SYSTEM

BACKGROUND

Hydrogen is the lightest, most abundant substance in the universe. Further, hydrogen is efficient in storing energy. For example, hydrogen has a heat of combustion per unit mass of 120.1 MJ/kg, which is about 3 times higher than the heat of combustion of gasoline.

Hydrogen can be utilized in environmentally friendly alternative energy conversion devices such as hydrogen combustion engines and fuel cells. In a hydrogen combustion engine, hydrogen can be combusted in the presence of oxygen to produce only water as a byproduct. Therefore, unlike gasoline, hydrogen can be combusted without producing environmentally unfriendly byproducts such as carbon dioxide, carbon monoxide, sulfur containing compounds and the like. In a fuel cell, hydrogen and oxygen can be catalyzed at opposite electrodes of the fuel cell to produce a potential difference across an electrochemical cell. As in hydrogen combustion engines, fuel cells can react hydrogen and oxygen to convert energy while producing water as the sole product.

Hydrogen is a very light gas and has a very low volumetric density at atmospheric pressure. Hydrogen can be produced and/or purified by many clean methods. For example, hydrogen can be produced from water through electrolysis powered by photoelectric cells. However, many challenges must be overcome to efficiently store hydrogen.

Several different strategies have been utilized to efficiently store hydrogen at high densities. A first strategy involves storing hydrogen at high pressure, for example, pressures up to 10,000 psig. However, storing hydrogen at a high pressure requires special structures such as, for example, hydrogen storage containers having very thick walls, which increases the overall weight and cost of the system. Further, high pressure hydrogen storage systems require costly valves, pumps, and control systems for maintaining hydrogen at high pressure levels and for transporting hydrogen between a high pressure environment for hydrogen storage and a low pressure environment for applications.

A second strategy for storing hydrogen is liquefying hydrogen at cryogenic temperatures. However, this strategy also has several drawbacks. For example, in order to liquefy hydrogen, extremely low temperature (that is, a temperature of about 20 Kelvin) is required. Therefore, storing liquid hydrogen is inefficient in that it requires high energy (approximately one-third the energy produced by hydrogen combustion) to obtain and maintain cryogenic storage temperatures and in that it requires an expensive refrigeration system.

A third strategy for storing hydrogen is hydrogen storage utilizing solid state hydrogen storage mediums, such as, for example, metal hydrides. Metal hydrides absorb and desorb hydrogen without refrigeration at low pressures that can be easily obtained. Therefore, metal hydrides do not have the high energy and high systems costs associated with high pressure hydrogen storage systems and liquid hydrogen storage systems. Further, hydrogen can be stored at a higher volumetric density in metal hydride storage systems than in either high pressure hydrogen storage systems or liquid hydrogen storage systems.

Currently, several challenges must be addressed to commercialize hydrogen storage systems utilizing solid hydrogen storage medium. Hydrogen molecules are very small, making hydrogen containment in a sealed container challenging. Further, the hydrogen storage container must be durable and must maintain its physical structure. So that it does not deform and rupture. Furthermore, the solid state hydrogen storage system must operate within acceptable safety margin. Further, the system must be easily manufacturable. Still further, the system must meet certain performance requirements. For example, the system must route hydrogen to specific locations within the system, must sufficiently control and maintain the temperature of hydrogen storage medium for adsorption and desorption of hydrogen, and must sufficiently maintain the hydrogen at selected elevated pressures. Still further, for vehicle applications, the system must store large amounts of hydrogen per unit weight and unit volume.

In addition to the stresses caused by storing hydrogen under pressures, hydrogen storage systems utilizing solid hydrogen storage medium are subjected to additional stresses caused by the expansion and contraction of hydrogen storage medium. For example, some hydrogen storage mediums expand by up to 25% during a hydrogen storage phase and then contract to its original volume during a hydrogen release phase. Unlike stresses associated with storing compressed gasses, systems utilizing solid hydrogen storage medium will produce localized stresses on the outer walls of the hydrogen storage container. These localized stresses are due to hydrogen storage medium expanding and producing stresses in contact areas between the material and the outer wall. Therefore, these localized pressures can be much greater than the hydrostatic pressure of hydrogen gas inside the storage chamber.

Other challenges that must be addressed related to efficient heat transfer and efficient hydrogen absorption and desorption rates. In order for this absorption process to occur, heat needs to be removed during the reaction process. In addition, heat needs to be supplied during the desorption process. Therefore, the system needs to be equipped to efficiently heat and cool the metal hydrides during hydrogen desorption and absorption. Further, in order to transfer hydrogen into and out of the system, hydrogen gas must be efficiently supplied and uniformly distributed to each of the hydrogen storage containers.

Examples of hydrogen storage systems are contained in U.S. Pat. Nos. 6,318,453, 6,709,497, 6,833,118, 6,969,545, 6,991,770, and 7,241,331. Each the systems disclosed in these patents utilize heat transfer elements inside a single chamber in which hydrogen storage medium is stored. These systems are heavy, bulky, difficult to manufacture. Some of these challenges were solved by the present inventors in U.S. Pat. No. 6,918,382. However, U.S. Pat. No. 6,918,382 differs from the instant disclosure several ways. For example, the current application teaches an improved heat transfer system over the air cooling apparatus of the '382 patent, Further, the '382 patent does not teach a hydrogen storage system with convenient hydrogen storage medium replacement means. Still further, the '382 system has straight tubular hydrogen storage modules that are connected via a complicated and costly external network of pipes and fittings. Still further, the '382 patent does not have force distribution means. Further differences of the present system are described throughout the disclosure.

In addition to challenges discussed above, hydrogen storage systems utilized in transportation applications must meet standards set by administrative agencies. For example, in the United States, the United States Department of Transportation has implemented requirements for systems for transporting hydrogen gas in vehicles. To achieve commercialization, solid state hydrogen storage systems must meet this standard.

Therefore, a need exists for a hydrogen storage system that solves the problems listed above and that can be utilized for vehicle or stationary hydrogen storage application and can be manufactured by large-scale manufacturing operations.

SUMMARY

A system for the solid state storage of hydrogen in accordance with several exemplary embodiments is disclosed herein. The system includes a plurality of hydrogen storage containers. Each hydrogen storage container of the plurality of hydrogen storage containers has an inner chamber and an inlet. The inlet provides a pathway for introducing hydrogen gas into the inner chamber. The inner chamber having a solid hydrogen storage medium disposed therein. The system further includes an endplate manifold having a hydrogen receiving port, a plurality of hydrogen outlet ports, and a flow channel. The hydrogen flow channel is integrated into the endplate manifold. Each hydrogen outlet port is in fluid communication with the inlet of one of the plurality of hydrogen storage containers. The hydrogen flow channel provides fluid communication between the hydrogen receiving port and each hydrogen outlet port.

DETAILED DESCRIPTION

In the present disclosure a system for the solid state storage of hydrogen is described in accordance with several exemplary embodiments.

The system for the solid state storage of hydrogen of the present disclosure has several advantages over previous hydrogen storage systems. For example, the system of the present disclosure can store a greater amount of hydrogen per unit volume and a greater amount of hydrogen per unit mass than previous systems.

Since the system of the present disclosure has greater volumetric and mass storage efficiencies, the system can be more efficiently utilized in transportation applications. Further, the system of the present disclosure has excellent performance characteristics including fast hydrogen filling and discharge, easy replacement of hydrogen storage medium, excellent heat management properties, and high durability. Still further, the system of the present disclosure is less complicated, has lower component costs, and is more cost efficient to manufacture than previous systems.

One feature described in exemplary embodiments of the system of the present disclosure is the use of multiple hydrogen storage containers within the system. Another feature of the system is the ability to configure the system to utilize a selected number of hydrogen storage containers. The hydrogen storage containers can be standard, pre-certified hydrogen storage containers. The number of hydrogen storage containers can be selected based on hydrogen requirements of the desired application. For example, applications requiring a small amount of stored hydrogen may use a hydrogen storage system having a small number of hydrogen storage containers (for example, 10 or less). Applications requiring a large amount of stored hydrogen may use a hydrogen storage system having large number of hydrogen storage containers (for example, more than 10). However, both the system requiring a large amount of store hydrogen and the system requiring the small amount of store hydrogen can utilize hydrogen storage containers having substantially similar designs.

In one embodiment, the system has an endplate manifold that has an integrated hydrogen flow channel. The endplate manifold with integrated hydrogen flow channel is cost efficient to produce, and is lighter-weight, and more robust than previous hydrogen storage systems, which utilized several pipes, and connector pieces. In one embodiment, greater than 50% of the structural volume of the endplate manifold is formed from a single metal plate. Further, the integrated flow channel can route hydrogen between a hydrogen delivery port and separate hydrogen storage containers and can effectively distribute hydrogen to the separate hydrogen storage containers. Still further, the integrated hydrogen flow channels can provide uniform delivery of hydrogen from each of the hydrogen storage containers to the hydrogen delivery port.

In one embodiment, a hydrogen storage container of the system has a removable plug member. The removable plug member allows periodic replacement of hydrogen storage medium within the system. In particular, the removable plug member allows periodic replacement of hydrogen storage medium within an inner chamber of the hydrogen storage container. The removable plug member can be removed and reattached to the hydrogen storage container without affecting the structural integrity of the system.

In one embodiment, the system incorporates hydrogen storage containers that meet government regulatory standards. In particular, in one embodiment, the system incorporates hydrogen storage containers that meet government regulatory standards of the United States Department of Transportation for transporting hydrogen in vehicles.

Figure 1:
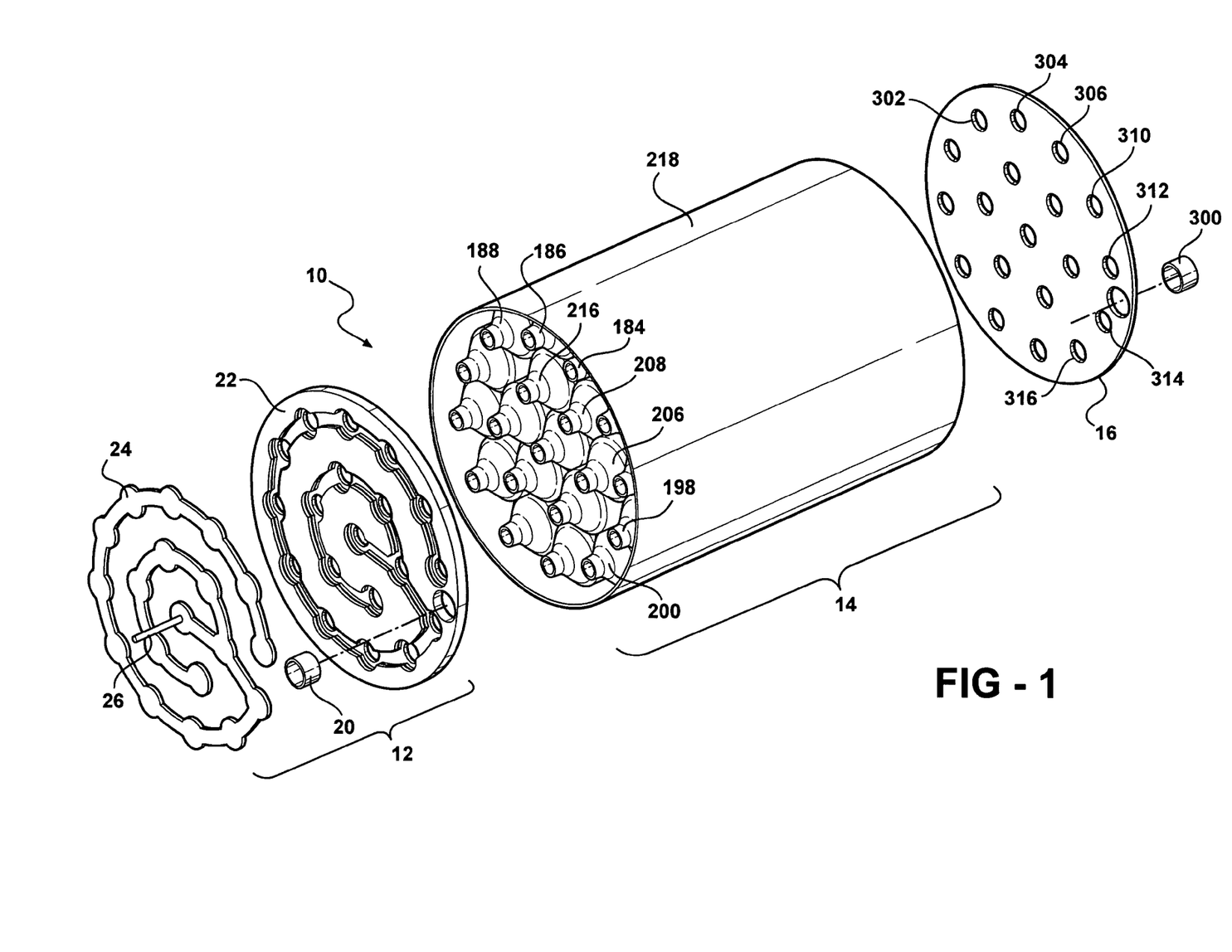
FIG. 1 is a prospective view of the system in accordance with an exemplary embodiment of the present disclosure.

Referring to FIG. 1, a system for the solid state storage of hydrogen 10 will now be described. The system 10 includes an endplate manifold 12, a hydrogen storage portion 14, and a hydrogen storage medium loading portion 16.

Figure 2:
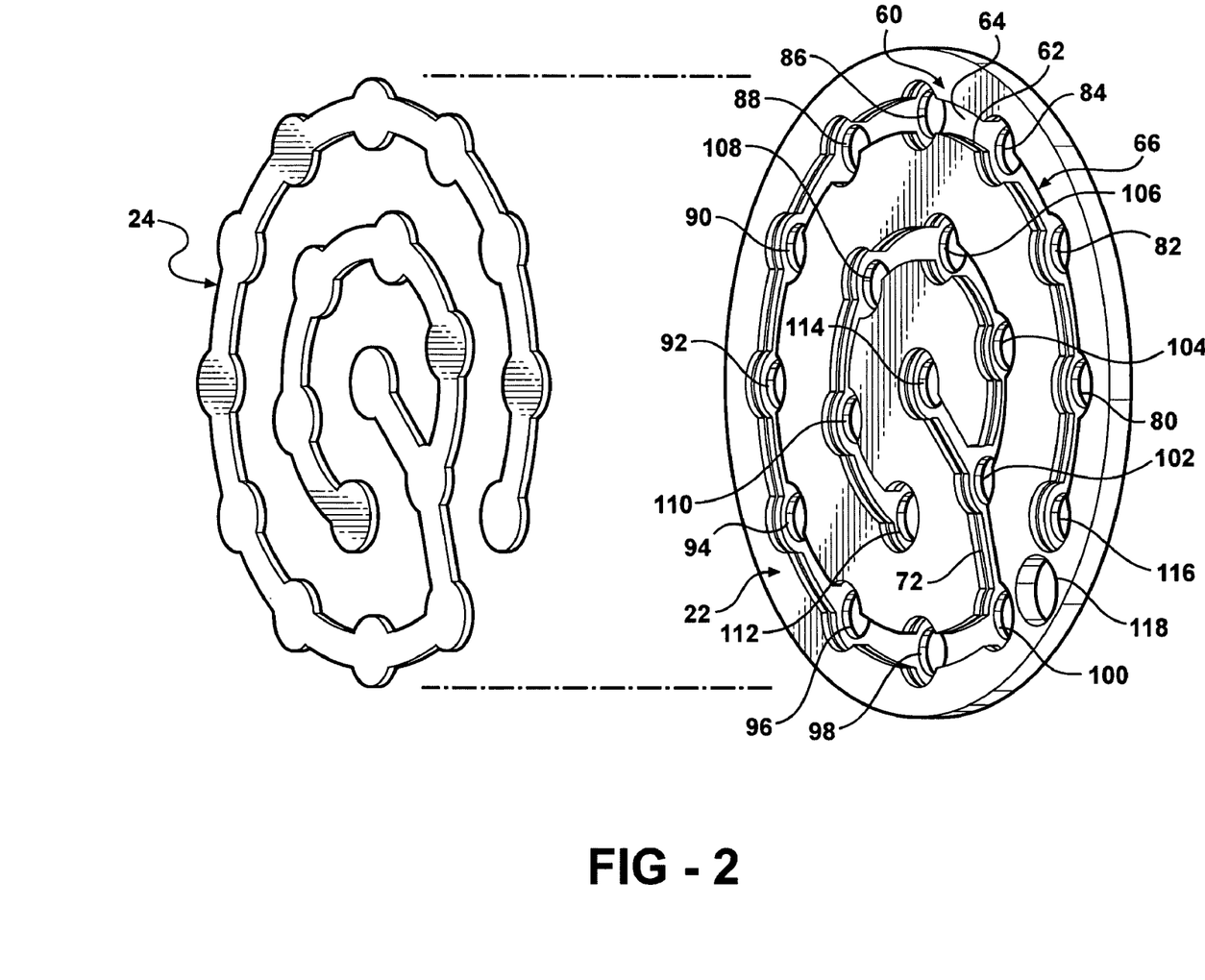
FIG. 2 is a prospective view of an inlet end plate of the system of FIG. 1.

Referring to FIGS. 1 and 2, the endplate 12 is provided to route hydrogen between the hydrogen storage portion 14 and an external hydrogen supply or delivery location. The endplate manifold 12 includes a coolant inlet 20, a manifold portion 22, a backing panel 24, and a hydrogen delivery port 26.

The coolant inlet 20 is provided to route coolant from an external location to the hydrogen storage portion of the system. The coolant inlet 20 defines a channel allowing coolant to flow through the endplate manifold and to the hydrogen storage portion. In one embodiment, the coolant inlet includes a separate collar welded to the manifold portion 22. The collar is adapted to provide a seal between a coolant delivery system and the system 10. Specifically, the collar has a threaded outer circumference to provide a fluid seal between the fluid delivery system and the system 10. The collar can comprise any material that is compatible with the coolant (that is, any material that is inert when in contact with the coolant) and with the operating environment of the system. In one embodiment, the collar comprises the same material as the manifold portion 22.

The manifold portion 22 has depressed regions 60 disposed therein. The depressed regions 60 define a support ledge 62, and base 64. The support ledge 62, the base 64, and the backing panel 24 define a hydrogen flow channel 66. The depressed regions 60 define a backing panel channel 68 above the support ledge wherein the backing panel 24 is disposed. Hydrogen storage ports 80, 82, 84, 86, 88, 90, 92, 94, 96, 98, 100, 102, 104, 106, 108, 110, 112, 114, and 116 extend through the base 64.

The hydrogen flow channel 66 has a pattern selected so that hydrogen can be distributed to and received from each of the hydrogen storage ports. In an exemplary embodiment, the hydrogen flow channel is defined to provide fluid communication between hydrogen ports and the hydrogen delivery port, wherein the hydrogen storage ports are arranged in an outer and inner circular path with a single hydrogen port located at the center. This shape allows for rapid uniform flow of hydrogen into and out of the hydrogen storage containers. This shape also allows hydrogen storage containers to be configured with a desired spacing for compact system design and for efficient cooling of hydrogen storage containers. In alternative exemplary embodiments, other patterns can be utilized to define hydrogen flow paths in the endplate, such as rectangular shaped paths or serpentine shaped paths.

The hydrogen flow channel 66 is integrated into the endplate manifold 12 in that the hydrogen flow channel is at least partially defined by the endplate manifold 12. In one embodiment, the hydrogen flow channel is substantially perpendicular to the hydrogen ports. In one embodiment, the hydrogen flow path completely defined by the manifold section 22 and the backing plate 24 of the endplate manifold 12.

The depressed region 60 is manufactured by removing material from the endplate 22. In an exemplary embodiment, the depressed region 60 is milled in the manifold portion 22 of the endplate 12. The endplate is milled to a first width and to a first depth to define the backing panel channel 68. The end plate is milled to a second width (narrower than the first width) and a second depth (deeper than the first depth) to define the hydrogen flow channel 66. The backing panel channel is superimposed on the hydrogen flow path channel. The first depth is greater than the first second depth, and the first width is narrower than the second width thereby creating the support ledge 62 throughout the hydrogen flow channel 66.

In an exemplary embodiment, the first depth is between 10 to 40% of the total thickness of end plate and the second depth is between 20 and 80% of the total thickness of the manifold portion 22. In another exemplary embodiment, the total thickness of the manifold portion 22 is between 0.3 inch and 0.5 inch, the first depth is between 0.1 inch and 0.2 inch and the second depth is between 0.2 inch and 0.4 inch, as measured from a top surface of the endplate. The hydrogen storage ports are circular holes cut through the entire thickness of the base 64 of the manifold portion 22.

The backing panel 24 is formed to a substantially similar shape, width and thickness to the backing panel channel such that the backing panel 24 fills the entire backing panel channel. After manufacturing the depressed region 60, the backing panel 24 is positioned such that it sits in contact with the support ledge 62. The backing panel is then welded to the manifold portion 22 at the outer border of the backing panel 24 and the inner border of the depressed region 60 providing a hydrogen tight seal therebetween. The backing panel 24 can be made from substantially similar material to that of the manifold portion 22.

The hydrogen ports route hydrogen into and out of the hydrogen storage portion 14 of the system 10. Each hydrogen storage port is in fluid communication with the hydrogen flow channel 66 so that hydrogen is transferred between each hydrogen storage port and the hydrogen delivery port.

The hydrogen delivery port 26 is provided to route hydrogen between an external location and the hydrogen flow channel 66. In one embodiment, the hydrogen delivery port 26 includes a separate collar welded to the backing panel 24. The collar is adapted to provide a seal between an external conduit and the system. Specifically, the collar has a threaded outer circumference to provide a seal between the external conduit and the system. The collar can comprise any material that is compatible with the hydrogen (that is, any material that is inert when in contact with the hydrogen) and with the operating environment of the system. In one embodiment, the collar comprises the same material as manifold portion 22.

The manifold portion 22 is manufactured from rigid material having a sufficient strength to support hydrogen storage containers. In an exemplary embodiment, the manifold portion 22 comprises a stainless steel material. In alternative exemplary embodiments, the manifold portion 22 can be manufactured from other metal materials such as aluminum, other metals, or metal alloys.

Since the manifold portion 22 has an integrated hydrogen gas manifold, the endplate is easier to manufacturer, more cost effect, and more robust, than systems that utilize external tubes and fittings. Further, the integrated hydrogen manifold allows the endplate to be lightweight and compact.

Referring to FIGS. 1 and 3-7, the storage portion 14 of the system 10 will be described. The storage portion 14 includes hydrogen storage containers 180, 182, 184, 186, 188, 190, 192, 194, 196, 198, 200, 202, 204, 206, 208, 210, 212, 214, 216, an outer casing 218, and spacing members 220, 222, 224, 226, 228, 230, 232, 234, 236, 238, 240, 242, 244, 246, 248, 250, 252, 256, and 258.

Figure 3:
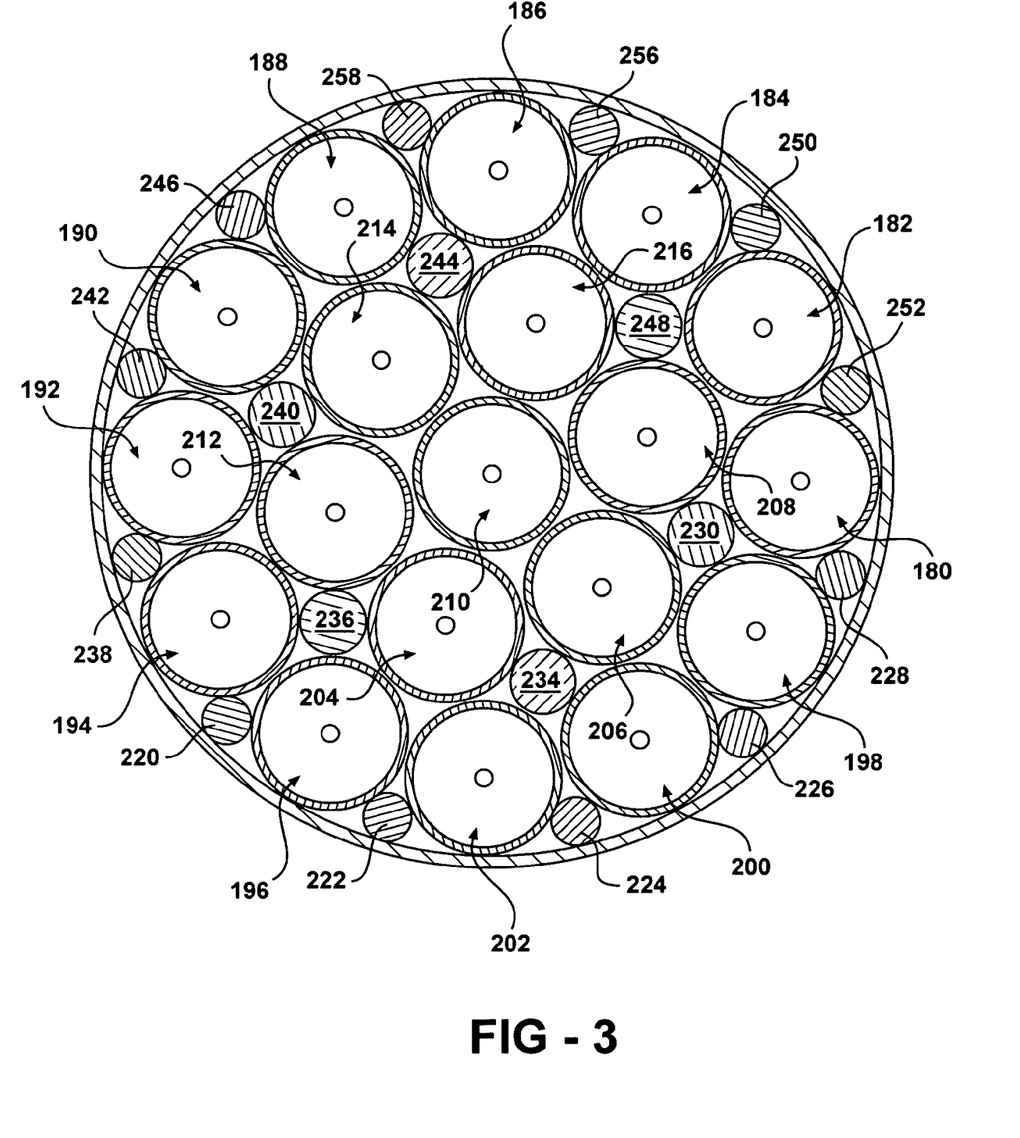
FIG. 3 is a cutaway view of the system of FIG. 1 along a second plane.

Referring to FIG. 3, the hydrogen storage containers will be described with reference to hydrogen storage container 180. However, it is to be understood that other hydrogen storage containers of the system 10 can have a substantially similar design to hydrogen storage container 180.

The hydrogen storage container 180 comprises a casing 260 a hydrogen storage medium 262, a gas distributor 264 and a force distribution component 266. The casing 260 defines a hydrogen inlet portion 270, an inner chamber 272 and an end portion 274. The inlet portion 270 and the end portion 274 have a smaller outer and inner diameter than the inner chamber 272. The inlet portion 270 and the end portion 274 have a threaded inner circumference. The hydrogen storage medium 264 and the force distribution component 266 are disposed within the inner chamber 272.

The casing 260 comprises metal material capable of maintaining gas within the container at elevated pressures. In an exemplary embodiment, the casing 260 is formed stainless steels using a spin forming process. In another exemplary embodiment, the casing 260 if formed from aluminum alloys using a spin forming process. In other embodiments, the system can include containers made from other materials such as other metals, or containers made by other processes for example other stamping or molding processes. In one embodiment, the hydrogen storage container meets general requirements for gas storage in transportation applications.

To meet general requirements for transportation application, the casing 260 can have a galvanic corrosion barrier layer disposed on an inner surface. In an exemplary embodiment, the galvanic corrosion layer comprises polymer coating. In an alternative exemplary embodiment the galvanic corrosion layer comprises a glass-fiber/epoxy composite layer.

In one embodiment, the hydrogen storage container 180 can contain hydrogen at pressures of greater than 250 psig. In one embodiment, the hydrogen storage container 180 can contain hydrogen at pressures of greater than 500 psig. Further, the hydrogen storage container 180 is certified according to the standards and codes as defined by the United States Department of Transportation.

The gas distributor 264 is provided to distribute hydrogen throughout the inner chamber of the hydrogen storage container. The gas distributor 264 is disposed longitudinally extending along a central axis of the hydrogen inlet portion, the inner chamber, the end portion of the hydrogen storage container. The distributor includes a threaded coupling member 282, and a distributor manifold section 284.

The threaded coupling member 282 is provided to secure the distributor 264 to the casing 260. In particular, the threaded coupling member 282 mates with the threaded inner circumference of the hydrogen inlet portion 270 of the casing 260 to secure the distributor 264 to the casing 260.

The distributor manifold section 284 has a thin wall and small diameter to provide space for hydrogen storage medium within the inner chamber cavity. The depressed region 284 has a stainless steel wire cloth filter disposed at an outer potion. The cloth filter allows hydrogen to pass to and from an inner portion of the distributor while preventing, hydrogen storage medium 262 entering the inner portion of the distributor. The distributor manifold section 284 further has heat conductive segmental plates having one or more holes to accommodate the gas distribution tubes. The distribution tubes has a filter to further prevent metal hydride fines (fine particles) from clogging gas flow within the depressed region or escaping the inner chamber. The distribution tubes route hydrogen to specific locations within the inner chamber 272.

In an alternate exemplary embodiment, the distributor manifold can comprise other types of filters. For example, in one embodiment the distributor manifold can comprise a metal wire cloth rapped around a metal tube. The tube can be disposed within the inlet portion of the hydrogen storage container or can be disposed other locations within hydrogen storage container in the flow path of hydrogen gas.

The hydrogen storage medium 262 can be one of several types of hydrogen storage mediums. In one embodiment, the hydrogen storage medium is a metal hydride storage material. Exemplary metal hydride hydrogen storage mediums include $AB_5$ alloy materials (for example, $LaNi_5$), AB alloy materials (e.g., FeTi), $A_2B$ (e.g., $Mg_2Ni$), $AB_2$ alloy materials (e.g., $ZrV_2$), Body-Centered Cubic (BCC) alloys, and $A_2B_7$ alloy materials. In other embodiments, the hydrogen storage medium can include one or a combination of different types of storage materials along with, or instead, of metal hydride storage materials. These storage materials include: glass microsphere storage material, polymer storage material, phosphate boride storage material, fullerene storage material, graphite storage material, ammonia storage material or like storage materials.

The removable cap member 268 has a threaded outer circumference that mates with the threaded inner circumference of the end portion 274 sealing the inner chamber 272. An operator can screw in and unscrew the cap member to open and reseal the inner chamber 272. Thus, hydrogen storage medium can be periodically removed from the inner chamber 272 through the end portion 274 of the casing and replaced by new hydrogen storage medium.

The force distribution component 266 is provided to reduce localized forces on the casing 260 of the hydrogen storage container. The force distribution component can accomplish this by providing sufficient counterforce to the hydrogen storage medium to maintain the hydrogen storage medium in a desire position when the hydrogen storage medium is not charged with hydrogen, while absorbing forces due to the expansion of the hydrogen storage medium when the hydrogen storage medium is charged with hydrogen.

In general, the force distribution component can include any structure that reduces localized forces on the outer wall of the hydrogen storage container. In one embodiment, the force distribution component reduces localized forces by maintaining spatial positions of hydrogen storage medium. In one embodiment, the force distribution component reduces localized stresses by distributing forces due to the expansion of hydrogen storage medium. In one embodiment, the force distribution component reduces localized stresses by absorbing forces due to expansion of hydrogen storage medium. In one embodiment, the force distribution component can reduce localized stresses by reversibly changing shape or changing position to absorb forces resulting from the expansion of the hydrogen storage medium.

An aspect of the force distribution component is that its primary function is not hydrogen storage, but instead its primary function is to equalize and distribute the forces caused by the expansion and contraction of hydrogen storage alloy. However, in addition to force distribution, the force distribution component can provide other functions such as heat transfer or gas distribution.

The applied force due to the expansion and contraction of hydrogen storage medium can be a tensile (pulling) forces, compressive (pushing) forces, shear, bending or torsion (twisting). Deformation can include any change of geometry and in particular can be defined as a change in geometry which causes a height, length, depth, or angle of a portion of the hydrogen storage component to change at least 0.1% or much more, specifically at least 10% depending on the materials' mechanical behavior. The amount of strain in response to the amount of stress introduced by the hydrogen storage medium is detected by strain gauges mounted on the outside wall of the hydrogen storage container. In particular, the strain gauge is used to measure the maximum localized strain on the container wall caused by non uniform expansion of the hydrogen storage material. In one embodiment, the maximum localized stress on the an outer wall of the container with the force distribution component is less than 50% of the maximum localized stress without incorporating the force distribution component.

Although the force distribution component can change shape or position in response to an expansion force, it can also change shape or position in response to forces induced by other objects or in response to other stimuli. In one embodiment, the force distribution component changes position in response to a temperature change inside the hydrogen storage container. In one embodiment, the force distribution component changes shape or position when an electric or magnetic field is applied across the force distribution component.

Figure 4:
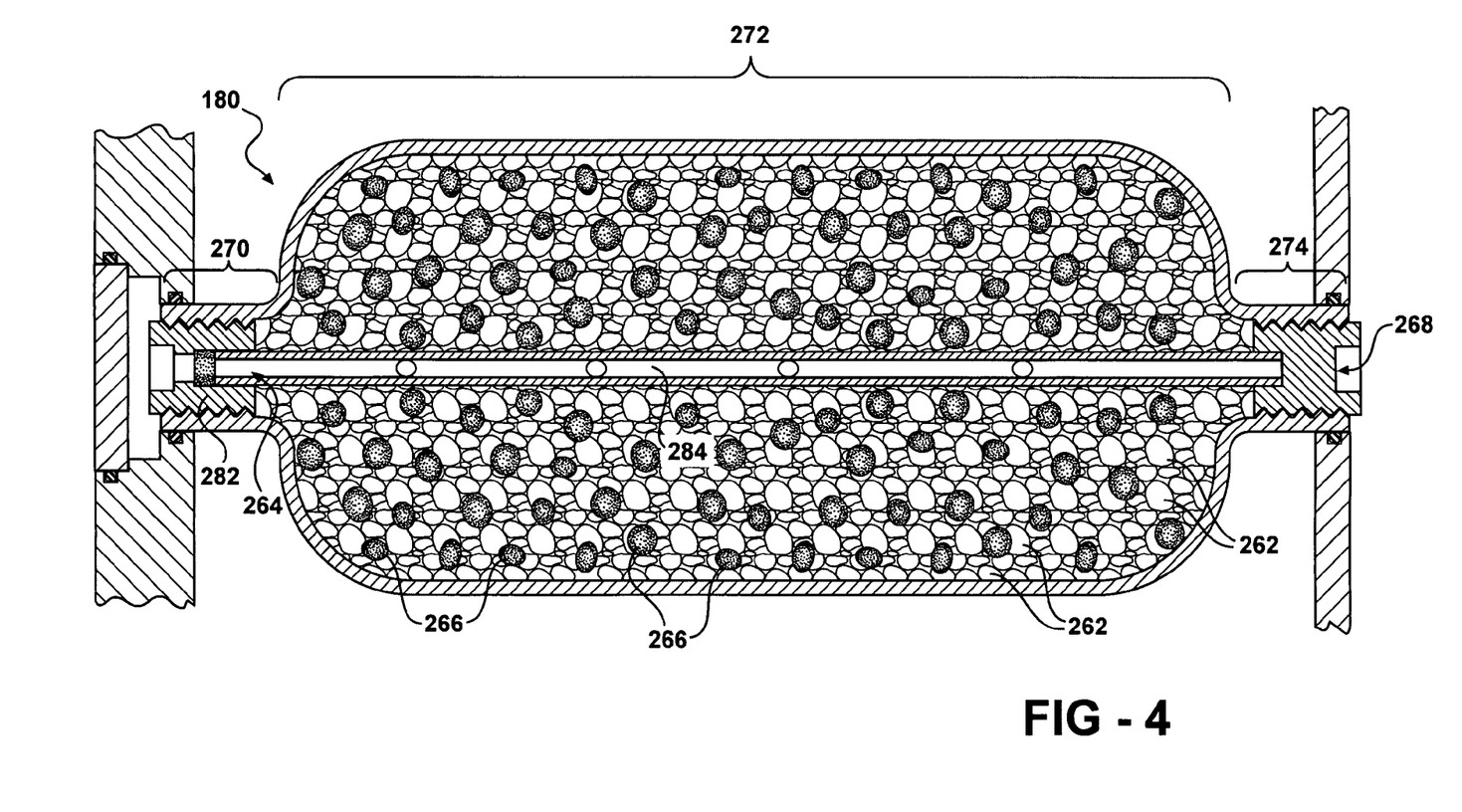
FIG. 4 is a cutaway view of a hydrogen storage container of a hydrogen storage system in accordance with an exemplary embodiment of the present disclosure.

Referring to FIG. 4, in one embodiment, the force distribution component is a resilient force distribution component 266. The resilient force distribution component has a sufficient rigidity to maintain the hydrogen storage medium in a desired position when the hydrogen storage medium is a contracted state (devoid of hydrogen.) However, as hydrogen storage medium expands upon absorbing hydrogen the forces on the resilient material increase causing the force distribution component to pseudoplastically deform.

The force distribution component 266 comprises several approximately spherically-shaped modules having a variety of sizes with an average diameter of about 1 inch. These modules are substantially uniformly distributed throughout the inner chamber 272. In an alternate embodiment, the force distribution component comprises a large continuous body or several large continuous bodies of material. The sizes and amount of force distribution component can vary depending on storage medium and operational requirements. The force distribution component can have any shape suitable of the application including pellets, beads, balls, particles, plates, rods, or tubes, etc. Their shape flexibility and sizes allow them to be readily loaded into the inner chamber 272 through the inlet portion 270 or the end portion 274.

The resilient member can comprise any resilient material whose properties are compatible with the general operating environment of the hydrogen storage container. These properties include inertness in the hydrogen reducing atmosphere and with the hydrogen storage mediums at the temperature of operation (for example, for systems utilizing low temperature metal hydride an operating temperature of 0 to 100 degrees Celsius).

In one embodiment, the resilient member comprises a resilient foam member. In one embodiment, the foam member comprises foamed siloxane polymer. In one embodiment, the foam member comprises polystyrene foams. In other embodiments the foam member comprises other resilient materials such as other synthetic polymer materials or nature polymer materials. Since the foam materials have a low density and high porosity, the foam material is lightweight and adds little mass to the storage system.

In an alternate embodiment, the resilient member comprises a spring member comprises spring material that will retain its resilient properties during the operating conditions of the hydrogen storage container. In one embodiment, the spring material comprises stainless steel wire having high chromium, and/or nickel content. Exemplary spring materials include stainless steel such as wires include ASI 316 wire and nickel based super alloys such as those sold under the Inconel trademark by Special Metals Corporation.

In alternate embodiment, the force distribution component comprises hollow shells or porous metals, such as curled chips of aluminum and copper metals and their alloys. The hollow shells, porous metals, or curled chips of metals and alloys are lightweight and good heat conductors. They can moderate the packing density of hydrogen storage mediums and absorbing forces due to the expansion of hydrogen storage mediums.

The volume and weight of the force distribution component present in the inner chamber is sufficient to absorb forces due to the expansion of hydrogen storage medium without significantly limiting the amount of hydrogen that can be stored in the hydrogen storage container. In one embodiment, the force distribution component, in its expanded state, occupies between 1% and 30% of the volume of the inner chamber 272. In one embodiment, the force distribution component, in its expanded state, occupies between 2% and 10% of the volume of the inner chamber 272.

Figure 5:
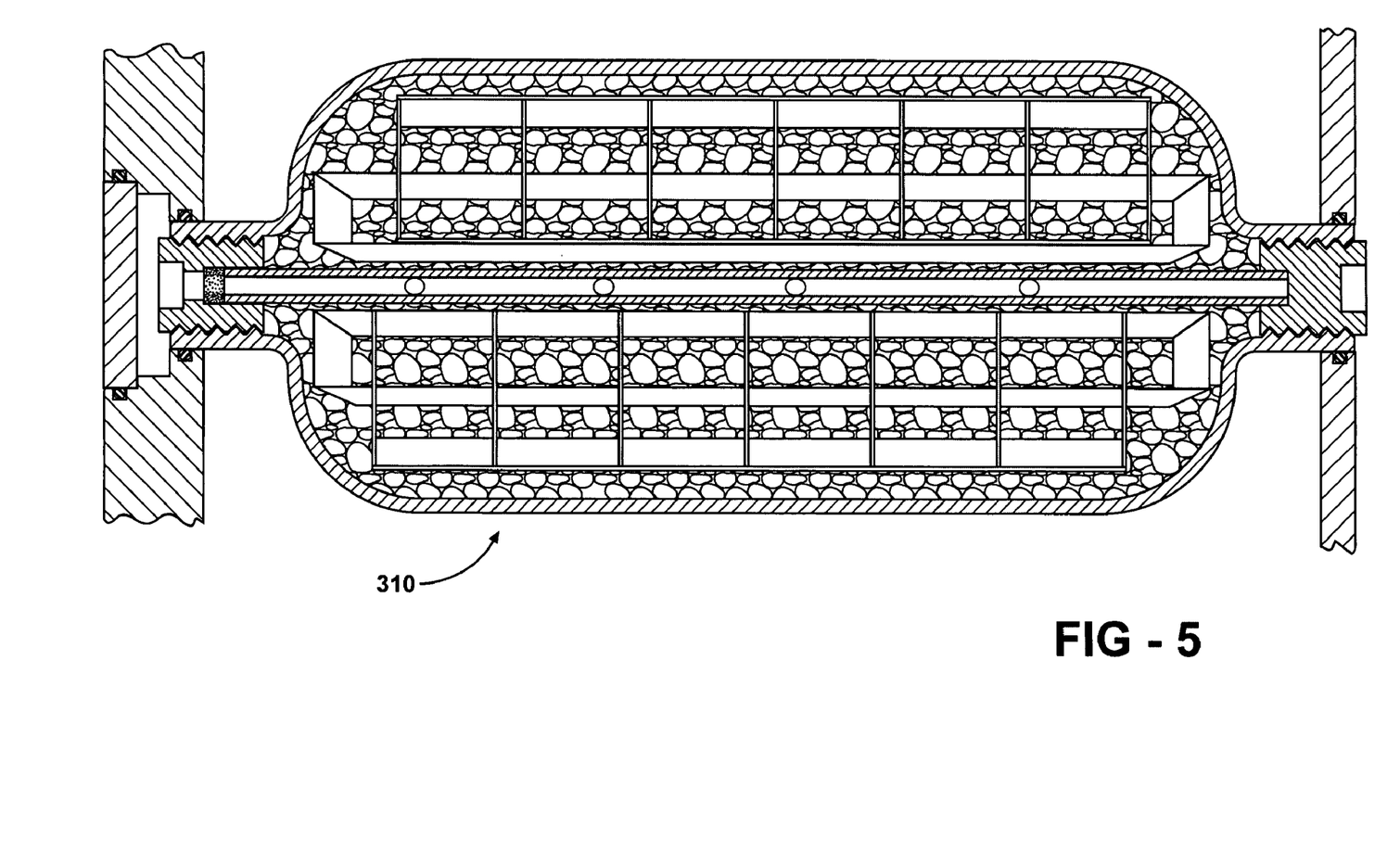
FIG. 5 is a cutaway view of a hydrogen storage container of a hydrogen storage system in accordance with another exemplary embodiment of the present disclosure.

Referring to FIG. 5, a force distribution component 310 is shown. The force distribution component 310 is a non-deforming force distribution component. The force distribution component comprises a cage having a plurality of beams that can interact with the hydrogen storage medium to hold the hydrogen storage medium at a fixed location. The cage is formed from stainless steel beams, which have a sufficient thickness so that the cage does not significantly deform during the expansion of hydrogen storage medium. The amount of expansion is limited by partitioning agglomerations of hydrogen storage medium. In alternative exemplary embodiments the cage can be formed from other materials such as other metals or other metal alloys Since the hydrogen storage medium is held at fixed location by the cage, large continuous agglomerations of hydrogen storage medium are not formed and therefore forces due to the expansion of hydrogen storage medium are uniformly distributed through the hydrogen storage container. As the hydrogen storage medium is charged with hydrogen, the beams can deflect and distribute the force of the expanding metal hydrides to minimize localized stresses on the container wall due to expansion.

Figure 6:
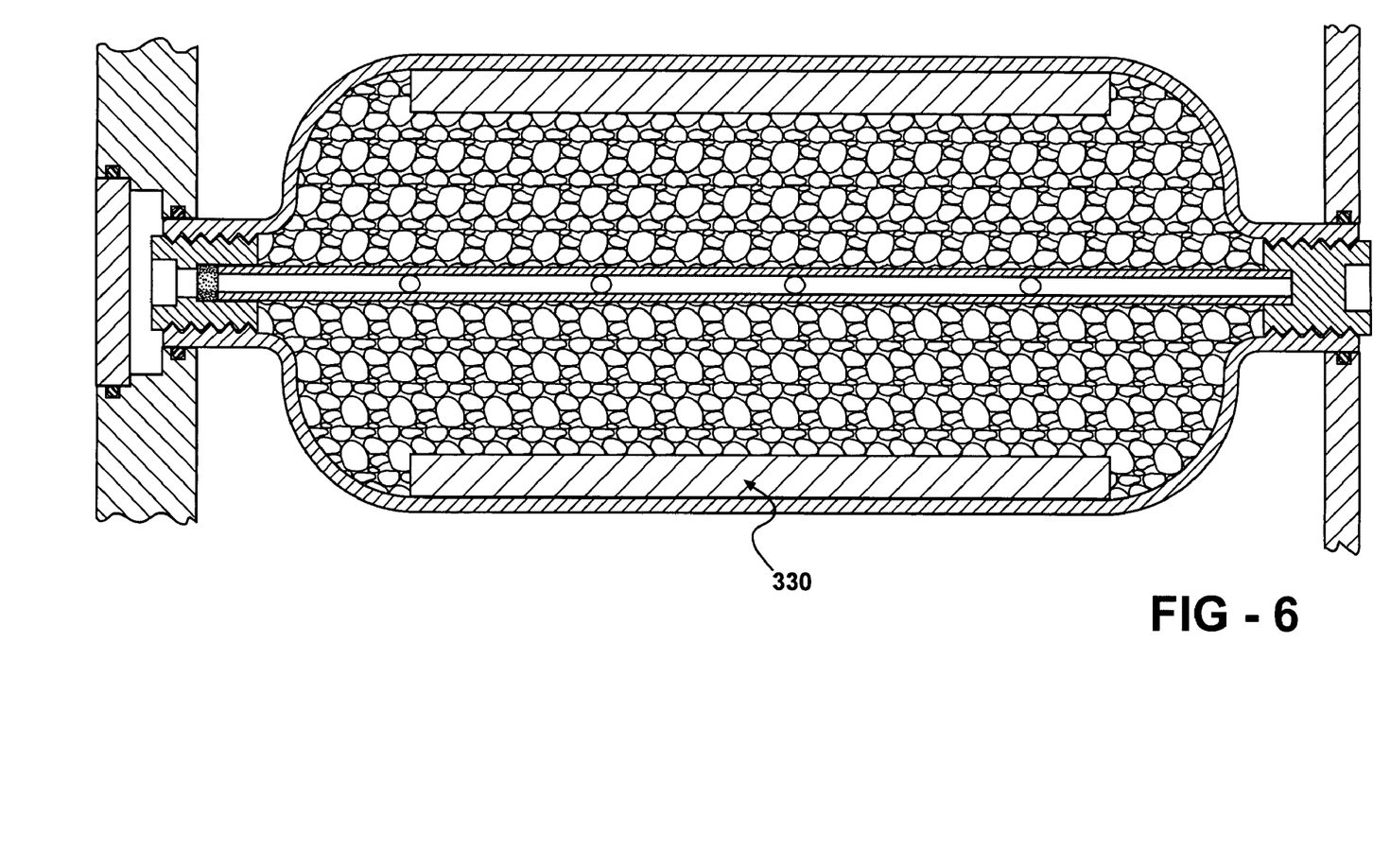
FIG. 6 is a cutaway view of a hydrogen storage container of a hydrogen storage system in accordance with another exemplary embodiment of the present disclosure.

Referring to FIG. 6, a hydrogen storage container having a force distribution component 330 is shown. The force distribution component 330 comprises a resilient lining.

The resilient lining is formed from a resilient, spring-like material that will retain its resilient properties during the operating conditions of the hydrogen storage container. In one embodiment, the resilient lining comprises a resilient stainless steel fiber mesh material. In other exemplary embodiments, the force distribution lining can comprise other resilient materials such as those described above force distribution component 330. When the lining is in a first state, the lining has sufficient mechanical strength to maintain the hydrogen storage medium in a selected position. However, the force distribution lining can contract in response to due to the expansion of hydrogen storage and therefore forces from material contacting localized areas of the lining are absorbed and distributed throughout the lining.

The outer circumference of a first end of each hydrogen storage container 180, 182, 184, 186, 188, 190, 192, 194, 196, 198, 200, 202, 204, 206, 208, 210, 212, 214, 216 is welded to the inner circumference of the corresponding hydrogen storage port of the endplate manifold 12. The hydrogen storage containers are welded to the inlet plate prior to welding the backing panel 24 to the manifold portion 22.

In another embodiment, the outer threaded circumference of a first end of each hydrogen storage container 180, 182, 184, 186, 188, 190, 192, 194, 196, 198, 200, 202, 204, 206, 208, 210, 212, 214, 216 is coupled to the threaded inner circumference of the corresponding hydrogen storage port of the endplate manifold 22. Sealant is applied between the threaded circumferences to form a tight connection to prevent hydrogen gas from leaking. The hydrogen storage containers are preferably attached to the inlet plate after welding the backing panel 24 to the manifold portion 22, so that the sealant between the threaded circumferences is not damaged by heat.

Each of the hydrogen storage containers is disposed coaxially with respect to each other, that is, each container extends along an axis in the same direction.

In order to efficiently store hydrogen in the system, the system 10 is designed to provide heat removal from the hydrogen storage containers. By utilizing multiple hydrogen storage containers within the system 10, heat can be removed more efficiently from the hydrogen storage containers than in a system that utilizes one large hydrogen storage container. In particular, heat can be transferred more efficiently due to the increased heat transfer surface area available between the outer wall of the hydrogen storage container and the cooling fluid and due to the decreased thickness of the container walls. Therefore the increase in heat transfer efficiency is directly related to the surface area to volume ratio of the hydrogen storage containers.

Assuming the containers are approximately cylindrically shaped and of approximately equal height, the surface area to volume ratio of a multi-container system having 5 containers has more than 2.2 times more surface area contacting an outside cooling fluid than a single container system of the same volume. Therefore, in this embodiment, the heat dissipation from the containers of the multi-container system is 2.2 times greater than the heat dissipation rate of a single container system having the same storage volume. Further, the surface area to volume ratio of a multi-container system having 7 containers has more than 2.6 times more surface area contacting an outside cooling fluid than the single container system.

Therefore, in this embodiment, the heat dissipation from the containers of the multi-container system is more than 2.6 times greater than the heat dissipation rate of a single container system having the same storage volume Still further, the surface area to volume ratio of a multi-container system having 10 containers has more than 3.1 times more surface area contacting an outside cooling fluid than a single container system. Therefore, in this embodiment, the heat dissipation from the containers of the multi-container system is more than 3.1 times greater than the heat dissipation rate of a single container system having the same storage volume.

Additionally, the thermal conductivity coefficient of metal hydride hydrogen storage medium is ten times lower than stainless steel and one hundred times lower than aluminum. Therefore, heat transfer is also reduced by the lack of heat conductance through hydrogen storage materials. Thus, the large radial distance for a large container of single container system imposes a higher thermal resistance than the radial distance of a smaller container of a multiple containers system. Increased heat transfer rates provide many advantages to the hydrogen system. For example, increasing heat transfer rates between the hydrogen storage medium and the cooling fluid decreases the required volumetric flow rate of cooling fluid. By decreasing the volumetric flow rate of the cooling fluid provides, the system allows for several options for increasing the energy efficiency and for decreasing the size and costs. For example, less space is needed for cooling fluid within the system reducing the volume of the system and reducing the materials costs. Further, lower flow rates are needed of cooling fluid is required reducing the pump size requirements and reducing energy costs associated with pumping cooling fluid through the system.

Referring again to FIGS. 1 and 3, the system 10 is a fluid cooled hydrogen storage system. In particular, system 10 is a liquid cooled hydrogen storage system. By utilizing liquid cooling, the system 10 can more efficiently transfer heat from the hydrogen storage container than air cooled hydrogen storage systems. The cooling fluid is routed through the cooling fluid inlet past the outer surface of the hydrogen storage containers and through the cooling fluid outlet. Various cooling liquids can be used to cool the system 10. In particular, liquids having a high heat capacity, low freezing point, and high evaporation point can be utilized. Exemplary fluids include methanol, water, glycols (for example, ethylene glycol, propylene glycol), and combinations thereof. In alternative exemplary embodiments, the cooling fluid can comprise gas phase components such as air.

The spacing members are positioned between each of the hydrogen storage containers. The spacing members can comprise elongated shapes such as elongated rods and can be hollow so as to reduce the overall weight of the system. The spacing members can provide structural stability to prevent excessive vibration between the hydrogen storage containers. Further, the spacing members can deflect cooling fluid to the outer portions of the hydrogen storage container so that enhanced cooling levels can be maintained. In an exemplary embodiment, the spacing members comprise a nylon polymer material. In alternative exemplary embodiments, the spacers can comprise various other materials that can withstand the temperature and operating conditions within the coolant fluid chamber of the system. In an alternative embodiment the spacing member can be other light weight material such as polymeric form. In yet another alternative embodiment, the system 10 does not include spacing member between the hydrogen storage containers.

Each of the hydrogen storage containers and the spacing members are disposed within the outer casing 218. The outer casing 218 is welded to the outer circumference of the endplate 22 at a first end of the casing 218 and is welded to the outer circumference of an endplate 54 of the hydrogen storage mediums loading portion 16 at a second end of the casing 218.

Referring again to FIG. 1, the hydrogen storage medium loading portion 16 comprises the endplate 54 and coolant outlet 56. The endplate 54 defines holes 302, 304, 306, 308, 310, 312, 314, and 316. The hydrogen storage containers are disposed through the holes of the outlet end plate 54 at a second end of the hydrogen storage containers. The outer circumference of the second end of the each of the hydrogen storage container is welded to the inner circumference of one of the holes of the endplate 54.

In an exemplary embodiment, a supplemental heat exchange circuit connects with the fluid chamber of the system at inlet and outlet 20 and 56, in order to remove heat from the cooling fluid. The external heat exchange circuit comprises a cooling fluid reservoir, a pump, a radiator, and a tubing system.

The pump forces the cooling fluid through the system and through the cooling fluid system. The cooling is routed from the reservoir to the inlet of the system. The cooling fluid travels through the system, which thereby heats the cooling fluid. The heated cooling fluid is then routed from the outlet of the system to the radiator. Moving air passes through the radiator thereby transferring heat from the cooling fluid. After exiting the radiator, the cooling fluid is routed to the reservoir.

A method for packing the hydrogen storage medium inside individual hydrogen storage containers will now be described. First, bulk ingots of hydrogen storage medium are crushed to fine grain particles. The material is then sieved through screens to classify the particle size and to control the particle size distribution. Thus, only particles in a selected narrow range are utilized for loading into hydrogen storage containers. In one embodiment, the particle size range is between one millimeter and 3 millimeters.

In one embodiment, the hydrogen storage medium is then mixed with a foam force distribution particles at a volume ratio of 90-95% hydrogen storage medium and 5-10% force distribution material (in their expanded state).

The method further includes introducing the hydrogen storage medium into the hydrogen container to a selected volumetric packing density. The volumetric packing density can be selected based on the type of hydrogen storage medium utilized in the system. In particular the volumetric packing density can be selected such, so that the hydrogen storage medium is well under its maximum packing density when storing hydrogen gas. For example, when packing the container, an approximately 50% of the bulk (crystallographic) density of hydrogen storage medium is selected for packing. In an exemplary embodiment in which $TiMn_2$ based metal alloys are used, the metal alloys have bulk density of 6.5 g/cc (as measured on an alloy ingot without porosity). Thus, the packing density of hydrogen storage alloy inside the container is preferably about 3.25 g/cc. Thus, the packing coefficient (that is, the volume of packing material over the total volume of the inner chamber) is approximately 0.5.

The hydrogen storage capacity of a hydrogen system is related to the packed mass of the hydrogen storage medium inside the container. A higher packing coefficient of a hydrogen storage container correlates to a higher hydrogen storage capacity, hence, a lightweight and compact system. However, aggressive packing was previously considered undesirable due to the expansion of hydrogen storage medium during hydrogen absorption.

In one embodiment, the use of the force distribution component eliminates void space present in the inner chamber to achieve a desired packing coefficient in a uniform loading, which reduces the level of maximum localized stresses on the casing 260 In one embodiment, the inner chamber of the hydrogen storage container contains by volume 55-95% hydrogen storage medium (at packing density), 5-30% force distribution component, and 25-45% free space for volume expansion during hydrogen absorption. Storage materials, force distribution components, and free space are preferably distributed uniformly throughout the inner chamber of a hydrogen storage container.

It should be understood that the present invention is not limited to the precise structure of the illustrated embodiments. The disclosure and discussion set forth herein is illustrative and not intended to limit the practice of the instant invention. While there have been described what are believed to be the illustrative embodiments of the instant invention, those skilled in the art will recognize that other and further changes and modifications may be made thereto without departing from the spirit of the invention, and it is intended to claim all such changes and modifications that fall within the full scope of the invention. It is the following claims, including all equivalents, in combination with the foregoing disclosure and knowledge commonly available to persons of skill in the art, which define the scope of the instant invention.

What is claimed is:

1. A system for the solid state storage of hydrogen comprising:
    a plurality of hydrogen storage containers, each hydrogen storage container of the plurality of hydrogen storage containers having an inner chamber and an inlet for introducing hydrogen gas into the inner chamber, the inner chamber having a solid hydrogen storage medium disposed therein;
    an endplate manifold having a hydrogen receiving port, a plurality of hydrogen outlet ports, and an integrated hydrogen flow channel, each hydrogen outlet port being in fluid communication with the inlet of one of the plurality of hydrogen storage containers, the hydrogen flow channel providing fluid communication between the hydrogen receiving port and each hydrogen outlet port.

2. The system of claim 1, wherein the plurality of hydrogen storage containers includes at least five hydrogen storage containers.

3. The system of claim 1, wherein the hydrogen flow channel of the endplate manifold is formed by a material removal process.

4. The system of claim 1, wherein the hydrogen flow channel of the endplate manifold is configured to route hydrogen in a flow path perpendicular to a hydrogen flow path through the receiving port.

5. The system of claim 1, wherein the hydrogen flow channel of the endplate manifold is configured to route hydrogen in a flow path perpendicular to a hydrogen flow path through the plurality of hydrogen outlet ports.

6. The system of claim 1, wherein greater than 50% of the structural volume of the endplate manifold is formed from a single metal plate.

7. The system of claim 1, wherein each of the hydrogen storage containers of the plurality of hydrogen storage containers is welded to the endplate manifold.

8. The system of claim 1, wherein each of the hydrogen storage containers of the plurality of hydrogen storage containers is threadedly coupled to the endplate manifold.

9. The system of claim 1, wherein said hydrogen storage medium is a hydrogen storage alloy.

10. The system of claim 1, said hydrogen storage medium comprises at least one hydrogen storage medium selected form the group consisting of a graphite hydrogen storage medium, a fullerene hydrogen storage medium and a polymer hydrogen storage medium.

11. The system of claim 1, wherein each hydrogen storage container of the plurality of hydrogen storage containers further comprises a hydrogen gas distributor member.

12. The system of claim 1, wherein each hydrogen storage container of the plurality of hydrogen storage containers further comprises a particulate filter, said particulate filter being configured to allow hydrogen gas flow therethrough while restricting the passage of hydrogen storage medium particles therethrough.

13. The system of claim 1, wherein each hydrogen storage container of the plurality of hydrogen storage containers further comprises an inlet for introducing hydrogen storage medium into the inner chamber the hydrogen storage container, wherein the inlet for introducing hydrogen storage medium into the inner chamber is not the inlet for introducing hydrogen into the inner chamber.

14. The system of claim 1, further comprising a removable plug member, said removable plug member being configured to prevent hydrogen flow through the inlet for introducing hydrogen storage medium into the inner chamber of the hydrogen storage container.

15. The system of claim 14, wherein the removable plug member is threadedly coupled to the hydrogen storage container.

16. The system of claim 1, wherein said endplate has a thickness of 0.125 inches to 1.5 inches.

17. The system of claim 1, wherein the plurality of hydrogen storage containers are disposed coaxially with respect to each other.

18. The system of claim 1, further comprising an outer cylinder and a heat transfer fluid, where the hydrogen storage containers are disposed inside the outer cylinder, and wherein the outer cylinder defines a flow path for the heat transfer fluid.

19. The system of claim 1, wherein the plurality of hydrogen storage containers comprises aluminum or stainless steel containers formed by a spin casting process.

20. The system of claim 1, further comprising a force distribution component, said force distribution component being configured to distribute the force produced by the expansion of the hydrogen storage medium such the force distribution component reduces localized forces in the hydrogen storage container.

21. The system of claim 20, wherein the force distribution component distributes force such that a maximum localized force is less than 50% of a maximum localized force without the force distribution component.

22. The system of claim 20, wherein the hydrogen storage medium comprises a hydrogen storage alloy having a charged and discharged state and wherein the hydrogen storage alloy comprises more than 70% of the volume of the inner chambers of the hydrogen storage containers when the hydrogen storage alloy is in the discharged state.

23. The hydrogen storage container of claim 20, wherein the force distribution component is distributed along an inner circumference of the inner chamber of the hydrogen storage container.

24. The hydrogen storage container of claim 20, wherein the force distribution component is a resilient member.

25. The hydrogen storage container of claim 20, wherein the force distribution a plurality of modules distributed throughout the hydrogen storage medium.

* * * * *